(12) United States Patent
Adkins et al.

(10) Patent No.: US 7,632,911 B2
(45) Date of Patent: Dec. 15, 2009

(54) LIQUID MODIFIED DIPHENYLMETHANE DIISOCYANATES

(75) Inventors: Rick L. Adkins, Hurricane, WV (US); William E. Slack, Moundsville, WV (US); Hersel Kemp, II, New Martinsville, WV (US); Lewis S. Newman, Wheeling, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 60 days.

(21) Appl. No.: 11/599,135

(22) Filed: Nov. 14, 2006

(65) Prior Publication Data

US 2008/0114186 A1    May 15, 2008

(51) Int. Cl.
*C08G 18/70* (2006.01)
(52) U.S. Cl. ......................................... 528/67; 564/248
(58) Field of Classification Search .................... 528/67; 564/248
See application file for complete search history.

(56) References Cited

U.S. PATENT DOCUMENTS

| | | | |
|---|---|---|---|
| 3,970,600 A | | 7/1976 | Falkenstein et al. |
| 4,318,861 A | * | 3/1982 | Babiec et al. ............... 560/332 |
| 5,777,023 A | | 7/1998 | Pavlin ......................... 524/590 |
| 5,881,648 A | | 3/1999 | Pavlin ......................... 101/491 |
| 6,242,556 B1 | * | 6/2001 | Markusch et al. ............. 528/67 |
| 6,255,432 B1 | | 7/2001 | Evans et al. |
| 6,342,576 B1 | | 1/2002 | Wenning |
| 6,730,405 B2 | | 5/2004 | Bernard et al. ........... 428/423.1 |

* cited by examiner

*Primary Examiner*—Karl J Puttlitz
*Assistant Examiner*—Sudhakar Katakam
(74) *Attorney, Agent, or Firm*—N. Denise Brown; Noland J. Cheung

(57) ABSTRACT

This invention relates to novel liquid, storage-stable diisocyanates and to a process for the preparation of these liquid, storage-stable diisocyanates. These comprise diphenylmethane diisocyanate and at least one compound which contains both an amide group and a hydroxyl group and which corresponds to one of two specified formulas.

20 Claims, No Drawings

LIQUID MODIFIED DIPHENYLMETHANE DIISOCYANATES

BACKGROUND OF THE INVENTION

This invention relates to novel liquid, storage-stable, modified diphenylmethane diisocyanate compositions and to a process for the preparation of these novel liquid, storage-stable, modified diisocyanate compositions.

Polyisocyanate compositions exhibiting low viscosities and high functionalities and a process for their preparation are disclosed in U.S. Pat. No. 6,730,405. These polyisocyanate compositions may be reacted with a compound comprising a mobile hydrogen, which are also known as masking agents. Masking agents are described as having at least one functional group carrying a mobile (or reactive) hydrogen, and the functional group should have a pKa of at least 4 to less than or equal to 14.

U.S. Pat. Nos. 5,777,023 and 5,881,648 disclose diamidediurethanes and hot melt printing from hot melt inks comprising these diamidediurethanes. The diamidediurethanes are prepared by reaction of a hydroxycarboxylic acid and/or lactone with either (1) monoamine and diisocyanate, or (2) diamine and monoisocyanate. These may also be prepared by reacting a non-hydric carboxylic acid and/or anhydride with a hydroxylamine and a diisocyanate. These products are solids. Also, the products are diurethanes, end-capped with an amide group.

It has surprisingly been found that diisocyanates which are modified with a compound containing both an amide and a hydroxyl group as described herein are low viscosity liquid products which are storage-stable at room temperature. It has also been found that these modified diisocyanates exhibit lower freezing points than the corresponding unmodified diisocyanates. Advantages of these modified diisocyanates include the ability of store and use them in processes without the need to maintain a >25° C. storage temperature

SUMMARY OF THE INVENTION

This invention relates to liquid, storage-stable diisocyanates having an NCO group content of 11 to 32% by weight, and to a process for the preparation of these liquid, storage-stable diisocyanates.

These liquid, storage-stable diisocyanates comprise the reaction product of: (A) diphenylmethane diisocyanate, with (B) at least one compound which contains both an amide group and a hydroxyl and corresponds to one of two specified formulas.

The a diphenylmethane diisocyanate (A) comprises:
(1) from 0 to 6% by weight of the 2,2'-isomer,
(2) from 0 to 60% by weight of the 2,4'-isomer,
and
(3) from 34 to 100% by weight of 4,4'-isomer, wherein the sum of the %'s by weight of (1), (2) and (3) totals 100% by weight of (A) the diphenylmethane diisocyanate.

Component (B) comprises at least one compound selected from the group consisting of:
(1) compounds which contain both an amide group and a hydroxyl group, and correspond to the structure:

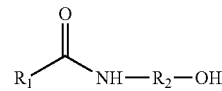

wherein:
    $R_1$: represents an alkyl radical containing from 1 to 20 carbon atoms, a cycloalkyl radical containing 5 to 6 carbons, or an aryl radical containing 6 carbons;
and
    $R_2$: represents an alkyl radical containing from 1 to 12 carbon atoms;
and
(2) compounds which contain both an amide group and a hydroxyl group, and correspond to the structure:

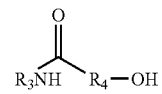

wherein:
    $R_3$: represents an alkyl radical containing from 1 to 16 carbon atoms, a cycloalkyl radical containing 5 to 6 carbons, or an aryl radical containing 6 carbons
and
    $R_4$: represents an alkyl radical containing from 1 to 12 carbon atoms.

The process for producing these liquid, storage-stable diisocyanates comprises reacting (A) diphenylmethane diisocyanate, with (B) at least one compound which contains both an amide group and a hydroxyl group and corresponds to formula (I) or (II) above, in the presence of at least one catalyst.

DETAILED DESCRIPTION OF THE INVENTION

As used in the present invention, the term liquid means that the modified diisocyanate or polyisocyanate product does not precipitate solids when stored at 25° C. for 3 months.

As used herein, the term "storage-stable" means that the modified diisocyanate or polyisocyanate product has up to a 1% absolute change in the % NCO group content and up to a 10% change in the viscosity when stored at 25° C. for 3 months.

The liquid, storage stable, amide-modified diisocyanates of the present invention are typically characterized by an NCO group content of at least about 11% NCO, and preferably of at least about 14% NCO. These liquid diisocyanates are also typically characterized by an NCO group content or less than or equal to about 32% NCO, and preferably less than or equal to about 30% NCO. The liquid modified diisocyanates may also have an NCO group content ranging between any combination of these upper and lower values, inclusive. For example, the liquid diisocyanates may have an NCO group content of from about 11% by weight NCO to about 32% by weight NCO and preferably from about 14% by weight NCO to about 30% by weight NCO.

In accordance with the present invention, the following components are, generally speaking, suitable.

Suitable diisocyanates to be used as component (A) herein include comprise diphenylmethane diisocyanate in which the 2,2'-isomer is present in an amount of from 0 to 6% by weight, and preferably 0 to 2% by weight; the 2,4'-isomer is present in an amount of 0 to 60% by weight, and preferably 1 to 30% by weight; and the 4,4'-isomer is present in an amount of from 34 to 100% by weight, and preferably 68 to 99% by weight. When mixtures of the 2,2'-isomer, the 2,4'-isomer and the 4,4'-isomer of diphenylmethane diisocyanate are used, the sum of the %'s by weight of the individual isomers totals 100% by weight of the diphenylmethane diisocyanate.

Component (B) comprises at least one compound selected from the group consisting of:
(1) compounds which contain both an amide group and a hydroxyl group, and correspond to the structure:

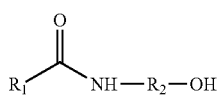
(I)

wherein:
$R_1$: represents an alkyl radical containing from 1 to 20 carbon atoms, a cycloalkyl radical containing 5 to 6 carbons, or an aryl radical containing 6 carbons, and preferably an alkyl radical containing from 1 to 3 carbon atoms;
and
$R_2$: represents an alkyl radical containing from 1 to 12 carbon atoms, and preferably from 1 to 6 carbon atoms;
and
(2) compounds which contain both an amide group and a hydroxyl group, and correspond to the structure:

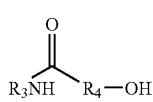
(II)

wherein:
$R_3$: represents an alkyl radical containing from 1 to 16 carbon atoms, a cycloalkyl radical containing 5 to 6 carbons, or an aryl radical containing 6 carbons, and preferably an alkyl radical containing from 2 to 8 carbon atoms;
and
$R_4$: represents an alkyl radical containing from 1 to 12 carbon atoms, and preferably from 2 to 6 carbon atoms.

Some examples of compounds which contain both an amide group and a hydroxyl group which correspond to structure (I) above and are suitable to be used as component (B)(1) herein include N-(2-hydroxyethyl)acetamide, N-(2-hydroxyethyl)propanamide, N-(3-hydroxypropyl)acetamide, N-(2-hydroxyethyl)cyclohexanecarboxamide, N-(2-hydroxyethyl)benzamide, etc. Preferred compounds are N-(2-hydroxyethyl)acetamide, and N-(3-hydroxypropyl) acetamide.

Some examples of compounds which contain both an amide group and a hydroxyl group which correspond to structure (II) above and are suitable to be used as component (B)(2) herein include N-methyl-3-hydroxylpropanamide, N-(2-ethylhexyl)-6-hydroxyhexamine, N-cyclohexyl-6-hydroxyhexanamide, N-phenyl-6-hydroxyhexanamide, etc. Preferred compounds are N-methyl-3-hydroxylpropanamide, and N-(2-ethylhexyl)-6-hydroxyhexamine.

In a preferred embodiment of the invention, it is preferred to react from 0.01 equivalent of component (B) per equivalent of component (A) up to 0.5 equivalent of component (B) per equivalent of component (A) in preparing the liquid, storage stable, modified diisocyanates of the invention. It is preferred that from 0.03 to 0.20 equivalent of component (B) per equivalent of component (A) is present.

In accordance with the present invention, a suitable catalyst may be present. Some examples of such catalysts include, but are not limited to, zinc acetylacetonate, zinc 2-ethylhexanoate, and other common zinc compounds, tin octanoate, dibutyltin dilaurate, and other common tin compounds, cobalt naphthanate, lead linoresinate, titanium 2-ethylhexanoate and other titanium (IV) compounds, zirconium 2-ethylhexanoate and other common zirconium (IV) compounds, bismuth 2-ethylhexanoate and other common bismuth compounds. The catalyst is typically used in an amount of at least about 50 ppm, and preferably at least about 100 ppm, based on the weight of isocyanate compound. The catalyst is also typically used in an amount of less than or equal to 5000 ppm, and preferably of less than or equal to about 1000 ppm, based on the weight of the isocyanate compound. The catalyst may be present in an amount ranging between any combination of these upper and lower values, inclusive. For example, the catalyst may be present in an amount of from 50 ppm to 5000 ppm, and preferably from about 100 ppm to 1000 ppm, based on the isocyanate compound.

Generally, the process of preparing the liquid, storage stable di- and/or poly-isocyanates of the invention comprises reacting (A) a suitable diphenylmethane diisocyanate component, with (B) a compound selected from the group of amides, bisamides and cyclic ureas as described above in the presence of a catalyst. The reaction typically is at a temperature of at least about 50° C., and more preferably at least about 70° C. The reaction also typically is at a temperature of less than or equal to 150° C., and more preferably less than or equal to 120° C. The reaction may occur at a temperature between any combination of these upper and lower values, inclusive. For example, the reaction may occur at a temperature of from 50 to 150° C., and more preferably of from 70 to 120° C.

The modified isocyanate compositions of the present invention may be reacted with one or more isocyanate-reactive components to form, for example, polyurethanes and/or polyureas.

The following examples further illustrate details for the preparation of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples:
ISO A: 4,4'-diphenylmethane diisocyanate
Amide A: N-(2-ethylhexyl)-6-hydroxyhexamide
Amide B: N-(2-hydroxyethyl)acetamide Example 1

In a suitable flask, were added 250 g of Isocyanate A and the 20 g of Amide A, followed by heating to 60° C. under nitrogen. Zinc acetylacetonate (300 ppm) was added, and the mixture heated at 90° C. for 5 hours to yield a liquid product with 26% NCO.

Example 2

In a suitable flask, were added 250 g of Isocyanate A and the 20 g of Amide B, followed by heating to 60° C. under nitrogen. Zinc acetylacetonate (300 ppm) was added, and the mixture heated at 90° C. for 3 hours to yield a liquid product with 27.7% NCO.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A liquid, storage-stable diisocyanate having an NCO group content of 11 to 32% by weight, and comprising the reaction product of:
   (A) a diphenylmethane diisocyanate which comprises:
      (1) from 0 to 6% by weight of the 2,2'-isomer,
      (2) from 0 to 60% by weight of the 2,4'-isomer, and
      (3) from 34 to 100% by weight of 4,4'-isomer,
      wherein the sum of the %'s by weight of (1), (2) and (3) totals 100% by weight of (A) the diphenylmethane diisocyanate;
   with
   (B) at least one compound selected from the group consisting of:
      (1) compounds which contain both an amide group and a hydroxyl group, and correspond to the structure:

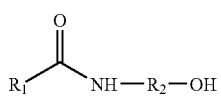
(I)

wherein:
      $R_1$: represents an alkyl radical containing from 1 to 20 carbon atoms, a cycloalkyl radical containing 5 to 6 carbons, or an aryl radical containing 6 carbons;
      and
      $R_2$: represents an alkyl radical containing from 1 to 12 carbon atoms;
   and
      (2) compounds which contain both an amide group and a hydroxyl group, and correspond to the structure:

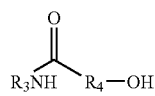
(II)

wherein:
      $R_3$: represents an alkyl radical containing from 1 to 16 carbon atoms, a cycloalkyl radical containing 5 to 6 carbons, or an aryl radical containing 6 carbons,
      and
      $R_4$: represents an alkyl radical containing from 1 to 12 carbon atoms;
   in the presence of one or more catalysts.

2. The liquid, storage-stable diisocyanate of claim 1, wherein the reaction of (A) with (B) is in the presence of at least one catalyst, with the quantity of catalyst ranging from 50 to 5000 ppm, based on the weight of component (A).

3. The liquid, storage-stable diisocyanate of claim 1, in which the reaction of (A) with (B) is at a temperature of from 50 to 150° C.

4. The liquid, storage-stable diisocyanate of claim 1, which has an NCO group content of about 14 to about 30% by weight.

5. The liquid, storage-stable diisocyanate of claim 1, in which component (B) comprises (1) a compound which corresponds to structure (I) wherein $R_1$ represents an alkyl radical containing from 1 to 3 carbon atoms and $R_2$ represents an alkyl radical containing from 1 to 6 carbon atoms.

6. The liquid, storage-stable diisocyanate of claim 1, in which (B) comprises (2) a compound which corresponds to structure (II) wherein $R_3$ represents an alkyl radical containing from 2 to 8 carbon atoms and $R_4$ represents an alkyl radical containing from 2 to 6 carbon atoms.

7. The liquid, storage-stable diisocyanate of claim 1, wherein (B)(1) comprises N-(2-hydroxyethyl)acetamide, N-(2-hydroxyethyl)propanamide, N-(3-hydroxypropyl)acetamide, N-(2-hydroxyethyl)cyclohexane-carboxamide, or N-(2-hydroxyethyl)benzamide.

8. The liquid, storage-stable diisocyanate of claim 1, wherein (B)(2) comprises N-methyl-3-hydroxylpropanamide, N-(2-ethylhexyl)-6-hydroxyhexamine, N-cyclohexyl-6-hydroxyhexanamide, or N-phenyl-6-hydroxyhexanamide.

9. The liquid, storage-stable diisocyanate of claim 1, wherein (A) said diphenylmethane diisocyanate comprises:
   (1) from 0 to 2% by weight of the 2,2'-isomer,
   (2) from 1 to 30% by weight of the 2,4'-isomer, and
   (3) from 68 to 99% by weight of the 4,4'-isomer,
   wherein the sum of the %'s by weight of (1), (2) and (3) totals 100% by weight of (A) the diphenylmethane diisocyanate.

10. The liquid, storage-stable diisocyanate of claim 1, wherein components (A) and (B) are present in amounts such that there are from 0.01 to 0.5 equivalents of component (B) per equivalent of component (A).

11. A process for the preparation of a liquid, storage-stable diisocyanate comprising:
   (1) reacting
      (A) a diphenylmethane diisocyanate which comprises:
         (1) from 0 to 6% by weight of the 2,2'-isomer,
         (2) from 0 to 60% by weight of the 2,4'-isomer, and
         (3) from 34 to 100% by weight of 4,4'-isomer,
         wherein the sum of the %'s by weight of (1), (2) and (3) totals 100% by weight of (A) the diphenylmethane diisocyanate;
      with
      (B) at least one compound selected from the group consisting of:
         (1) compounds which contain both an amide group and a hydroxyl group, and correspond to the structure:

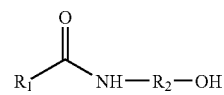
(I)

wherein:
            $R_1$: represents an alkyl radical containing from 1 to 20 carbon atoms, a cycloalkyl radical containing 5 to 6 carbons, or an aryl radical containing 6 carbons;

and

R$_2$: represents an alkyl radical containing from 1 to 12 carbon atoms;

and (2) compounds which contain both an amide group and a hydroxyl group, and correspond to the structure:

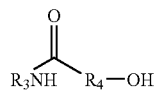 (II)

wherein:

R$_3$: represents an alkyl radical containing from 1 to 16 carbon atoms, a cycloalkyl radical containing 5 to 6 carbons, or an aryl radical containing 6 carbons, and R$_4$: represents an alkyl radical containing from 1 to 12 carbon atoms, in the presence of at least one catalyst.

12. The process of claim 11, wherein the reaction of (A) with (B) is in the presence of at least one catalyst, with the quantity of catalyst ranging from 50 to 5000 ppm, based on the weight of component (A).

13. The process of claim 11, in which the reaction of (A) with (B) is at a temperature of from 50 to 150° C.

14. The process of claim 11, which has an NCO group content of about 14 to about 30% by weight.

15. The process of claim 11, in which component (B) comprises (1) a compound which corresponds to structure (I) wherein R$_1$ represents an alkyl radical containing from 1 to 3 carbon atoms and R$_2$ represents an alkyl radical containing from 1 to 6 carbon atoms.

16. The process of claim 11, in which (B) comprises (2) a compound which corresponds to structure (II) wherein R$_3$ represents an alkyl radical containing from 2 to 8 carbon atoms and R$_4$ represents an alkyl radical containing from 2 to 6 carbon atoms.

17. The process of claim 11, wherein (B)(1) comprises N-(2-hydroxyethyl)acetamide, N-(2-hydroxyethyl)propanamide, N-(3-hydroxypropyl)acetamide, N-(2-hydroxyethyl)cyclohexanecarboxamide, or N-(2-hydroxyethyl)benzamide.

18. The process of claim 11, wherein (B)(2) comprises N-methyl-3-hydroxylpropanamide, N-(2-ethylhexyl)-6-hydroxyhexamine, N-cyclohexyl-6-hydroxyhexanamide, or N-phenyl-6-hydroxyhexanamide.

19. The process of claim 11, wherein (A) said diphenylmethane diisocyanate comprises:

(1) from 0 to 2% by weight of the 2,2'-isomer, (2) from 1 to 30% by weight of the 2,4'-isomer, and (3) from 68 to 99% by weight of the 4,4'-isomer, wherein the sum of the %'s by weight of (1), (2) and (3) totals 100% by weight of (A) the diphenylmethane diisocyanate.

20. The process of claim 11, wherein components (A) and (B) are present in amounts such that there are from 0.01 to 0.5 equivalents of component (B) per equivalent of component (A).

* * * * *